Jan. 23, 1951  F. O. HESS  2,539,135
HEAT-TREATING METALLIC BODIES
Original Filed April 12, 1943
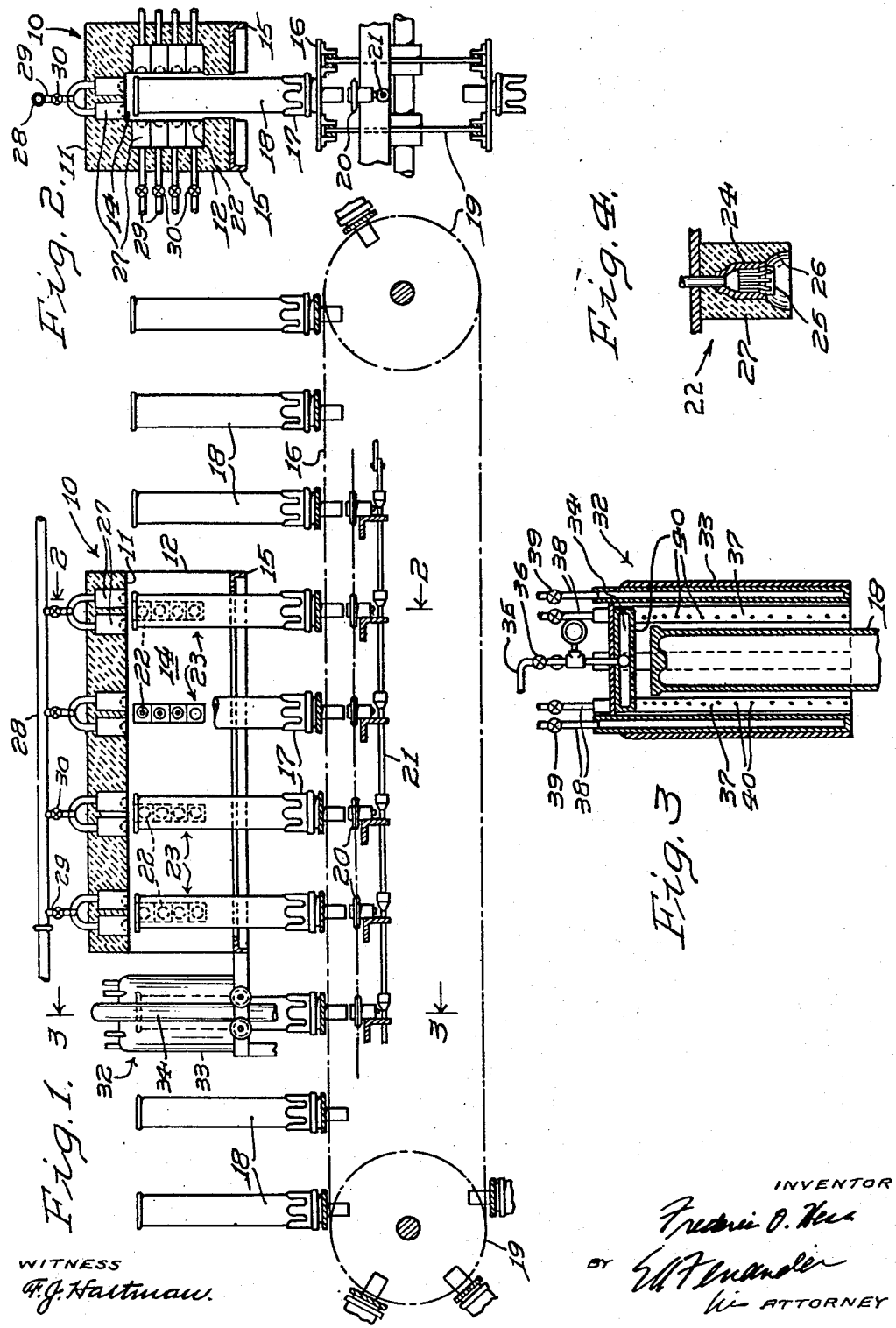
INVENTOR
Frederic O. Hess
BY
ATTORNEY
WITNESS
F. J. Hartman.

Patented Jan. 23, 1951

2,539,135

UNITED STATES PATENT OFFICE 2,539,135

HEAT-TREATING METALLIC BODIES

Frederic O. Hess, Philadelphia, Pa., assignor to Selas Corporation of America, Philadelphia, Pa., a corporation of Pennsylvania Original application April 12, 1943. Serial No. 482,697. Divided and this application December 14, 1944, Serial No. 568,146

6 Claims. (Cl. 263—8)

My invention relates to heat treating metallic bodies, and it is an object of the invention to provide an improvement for heat treating metallic bodies in rapid succession to a high temperature in a single pass through a heating chamber, as will appear from the following description and accompanying drawing forming a part of this specification, and of which:

Fig. 1 is a view diagrammatically illustrating apparatus embodying the invention;

Fig. 2 is a sectional view taken at line 2—2 of Fig. 1 to illustrate the invention more clearly;

Fig. 3 is an enlarged fragmentary sectional view, taken at line 3—3 of Fig. 1, to illustrate parts of the quenching unit more clearly; and Fig. 4 is an enlarged fragmentary sectional view of one of the heating units diagrammatically shown in Figs. 1 and 2.

In the drawing, the apparatus shown embodying the invention comprises an elongated heating structure 10 including a top wall 11 and spaced apart side walls 12 extending downwardly therefrom to form an elongated chamber 14. The heating structure 10 rests on a frame 15 which may be formed of angle members and supported in any suitable manner above a supporting surface. The walls 11 and 12 are formed of suitable ceramic material whereby the chamber 14 forms a refractory lined tunnel which is of inverted U-shape in section and open at the bottom.

A conveyor 16 extends lengthwise of chamber 14 beneath the top wall 11 and includes spaced apart members 17 formed to support work pieces 18 which extend upwardly into the chamber 14. The conveyor 16 is of the endless belt type and extends about spaced apart pulley wheels 19 located beyond the ends of the heating structure 10. The pulley wheels 19 are driven in any suitable manner to cause the members 17 to carry the work pieces 18 through the chamber 14.

The work pieces 18 are rotated during their travel through the chamber 14. In the illustrated embodiment, the conveyor 16 is adapted to be moved intermittently, and, during the intervals of time when the conveyor 16 and members 17 are stationary, a rotating movement is imparted to the members 17 and work pieces 18 supported thereon. This may be accomplished by providing a number of spaced apart vertically disposed spindles 20 which are located adjacent to and beneath the path of movement of the work supports 17. The spindles 20 are driven continuously from a shaft 21 which extends lengthwise of the heating structure 10.

The members 17 and spindles 20 may be so constructed and arranged that the members 17 are releasably connected to the spindles 20 when the members 17 are moved directly opposite the spindles. Thus, the members 17 and work pieces 18 carried thereby are rotated during the intervals of time the conveyor 16 is stationary, and the releasable connection between the members 17 and spindles 20 permits the members 17 to move automatically from one spindle to the next spindle during which period no rotating movement is imparted to the work pieces 18. The mechanism for imparting rotating movement to the members 17 has only been shown schematically since any well known mechanism may be employed to cause rotation of the work pieces 18 during their travel through the heating structure 10.

A plurality of gas-fired sources of radiant heat 22 are provided at the inner surfaces of walls 11 and 12. In the embodiment illustrated the heat sources 22 are arranged in groups to form a number of heating stations 23 in vertical alignment with the spindles 20. While in certain heat treating applications the heating stations 23 may vary from one another, the heating stations illustrated are similar in character with each other comprising twelve heat sources 22. As shown in Figs. 1 and 2, four heat sources 22 are disposed vertically one above the other at each of the side walls 12, and a cluster of four heat sources is located at the top wall 11 and bridges the two rows of heat sources at the side walls 12 which are directly opposite each other.

The radiant heat sources 22 are of the gas-fired type, and, as shown most clearly in Fig. 4, include a nipple 24, a distributor cap 25 and a parabolic radiator 26 of refractory material. Each radiator is formed in a block 27 of ceramic material which is incorporated in a wall of the heating structure 10. The parabolic radiators 26 are heated to a highly radiant condition by small gas flames produced at the distributor cap 25 which subdivides the gas mixture supplied thereto. The caps 25 serve to direct the flames along and closely adjacent to the parabolic radiators within which substantially complete combustion is accomplished, and the heated products of combustion pass into the refractory lined tunnel while the radiant heat waves are projected directly into the path of movement of the work pieces 18.

A suitable gas mixture is supplied under pressure from a source of supply through main conduits or manifolds extending lengthwise of the heating structure 10. One such main conduit or manifold 28 is shown in Figs. 1 and 2 for the heat sources 22 at the top wall 11, and it is to be understood that similar conduits or manifolds are provided for the heat sources 22 at the side walls 12. Branch or take-off conduits 29 are connected to the main conduits or manifolds for supplying the gas mixture to the heat sources 22, and suitable valves 30 are provided in these connections for independently controlling the supply of gas mixture to the heat sources.

When the work pieces 18 are formed of ferrous metal and heated to the critical hardening temperature in heating structure 10, it is desirable to cool the work pieces rapidly from the critical hardening temperature immediately upon passing from the heating structure, so as to accomplish the desired hardening of the work pieces. In order to effect such hardening of the work pieces, a quenching unit 32 is provided closely adjacent to the discharge end of the heating structure 10. The quenching unit 32 is of the bell type including a casing or bell 33 closed at the top and open at the bottom. The casing 33 may be movable along vertical guide rods 34 so that the casing may be lowered to the position shown in Fig. 1 after a work piece 18 has been moved by the conveyor 16 immediately below the casing. Before the conveyor 16 again moves to carry the work pieces 18 through the heating structure 10, the casing 33 is raised so that the work piece just quenched can pass from the quenching unit 32 and the next work piece can be moved into its quenching position, whereby the quenching operations may be accomplished during the intervals of time the conveyor 16 is stationary.

The raising and lowering of casing 33 may be accomplished with the aid of a suspension cable to the end of which a counterweight may be attached. It is to be understood, however, that downward and upward movement of casing 33 may be effected automatically by suitable mechanism which is controlled in such a manner that the quenching of each work piece 18 can be effected during the periods when the conveyor 16 is stationary and the work pieces 18 in the heating structure 10 are positioned at the heating stations 23.

Within the casing or bell 33 adjacent to the closed end thereof are positioned a number of pipe sections 34 which extend radially outward from the vertical axis of the casing. Four or more pipe sections 34 may be employed having their inner ends connected to a feed pipe 35 which extends upwardly from the top of the casing and in which is connected a valve 36 for regulating the supply of cooling water to the pipe sections 34.

A number of vertically disposed pipe sections 37 are located adjacent to one another within the outer wall of the casing 33. The pipe sections 37 are connected to individual feed pipes 38 which extend upward from the top of the casing and in which are connected valves 39 for controlling the supply of cooling water to each pipe section 37. The pipe sections 34 and 37 are formed with a number of openings or orifices 40 through which the cooling water is discharged into the interior of casing 33 for rapidly cooling ferrous metallic bodies from the critical hardening temperature to which they are heated in the heating structure 10.

During operation, the conveyor 16 is driven in the manner described above to carry the work pieces 18 to the inlet of the chamber 14 which is at the right-hand side of the heating structure 10, as seen in Fig. 1. The work pieces 18 are placed on the support members 17 near the right-hand pulley 19 and moved intermittently by the conveyor to the first heating station 23 nearest the inlet end of the chamber 14. After definite intervals of time each work piece is moved to the succeeding heating station 23 and is finally discharged from the outlet end of the chamber 14. In the event quenching of the heated work piece is required for hardening, such quenching is effected by the quenching unit 32 after which the work pieces may be allowed to fall by gravity at the left-hand pulley 19 into a suitable collecting receptacle. During the travel of the work pieces 18 through the chamber 14 a rotating movement is imparted to the work pieces, as explained above.

By employing gas-fired sources of radiant heat 22 at the walls 11 and 12 of chamber 14, the radiators 26 are heated to a highly radiant condition and radiant heat waves are projected directly from these radiators in the path of movement of the work pieces 18 and intersected by the latter. In addition, the heating of the work pieces 18 by the radiant heat waves is augmented by convection heating from the heated products of combustion developed by the gas-firing of the heat sources 22. The combustion of the gas mixture is substantially completed within the parabolic radiators 26 so that the work pieces 18 are enveloped by the products of combustion through which the radiant heat waves project, and flame impingement of the work pieces is avoided.

Since the work pieces can be rapidly heat treated and raised to temperatures as high as the critical hardening temperature of ferrous metals in a matter of seconds and minutes in a single pass through the chamber 14, it is my belief that such rapid heat treatment is due to the rapid heat penetration into the work pieces as the result of the transmission of a major portion of the heat by the radiant heat waves projected from the radiators 26 which are in a highly radiant condition and at close range to the work pieces 18 as the latter travel through the chamber 14. Since the flow of radiant heat from the heat sources 22 to the work pieces 18 is proportional to the difference of the absolute temperatures raised to the fourth power, it will be evident that the gas-firing of the radiators 26 to heat the latter to incandescence contributes to the rapid rate of heat input to the work pieces.

The intensity of the radiant heat energy can best be illustrated by giving the specific temperatures attained when the radiant heat sources 22 are gas-fired by a combustible mixture of air and ordinary city gas having a rating of about 500 B. t. u. per cubic foot. In such case the radiators can be heated to 2400° F. to 2500° F. without difficulty, and, when the work pieces 18 are immediately adjacent to the radiators and at close range thereto, an excess pressure may be developed in the parabolic radiators 26 whereby the latter may be maintained at an average temperature of 2700° F. and in a temperature range not below 2650° F. and as much as 2850° F. and higher.

Due to the rapid rate at which heat treatment of work pieces can be accomplished in a single pass through the heating chamber, the size of the heating structure can be made relatively small when the capacity of such structure is taken into consideration. In heating structures generally like that described and illustrated in which the work pieces travel through a refractory lined tunnel, it is possible to heat brass cartridge cases 5¾″ in diameter to an annealing temperature of about 1100° F. to 1200° F. at the rate of about 500 per hour in a heating structure approximately 8½ feet in length; and to heat steel cartridge cases of similar size to the critical hardening temperature of about 1650° F. at the rate of 500 per hour in a heating structure about 12 feet in length. The rapid rate of heat penetration is indicated by the fact that the brass cartridge cases are heated to the annealing temperature in about 30 seconds and the steel cartridge cases are heated to the critical hardening temperature in a minute or less. For the remainder of the travel of the work through the chamber 14 the cartridge cases are maintained and held at the elevated temperatures to which they are initially heated.

The work pieces 18 shown in the drawing are cartridge cases which are thicker in section at the base or closed end than at the cylindrical side wall. In heat treating cartridge cases of this type, it is desirable that the rate of heat input to the base or closed end should be greater than that to the part of the cylindrical side wall adjacent to the closed end, and that little or no heat should be applied to the part of the side wall adjacent to the bottom open end. Even with work pieces of this kind having different surface portions of varying thickness, the desired heat treatment of all surface portions of the work can be accomplished in a single pass through the chamber 14 by independently regulating the supply of the gas mixture to the heat sources 22 by proper adjustment of the valves 30, whereby a pattern of radiant heat waves may be produced which will be intersected by the work pieces so as to bring all surface portions of the work pieces to the desired elevated temperature at substantially the same rate and at the same time.

In certain instances it may be necessary or desirable to obtain a graduated hardness or heat treating effect on certain surface portions of the work pieces, and in such cases the heat sources are adjusted to produce a predetermined pattern of radiant heat waves which will be intersected by the work pieces in traveling through the chamber and enable the desired heat treating of all surface portions to be accomplished at the same time and in a single pass of the work pieces through the heating chamber. Since the work pieces 18 are rotated while in the heating chamber 14, all surface portions within the chamber will be intersected by the radiant heat waves projecting directly from the heat sources 22 through the enveloping atmosphere of the heated products of combustion, thereby insuring uniformity in the rate of heat input to the different surface portions of the work pieces.

Likewise, the openings or orifices 40 in the quenching unit 32 may be so distributed and of such size that, with proper adjustment of the valves 36 and 39, the rate at which cooling of different parts of the work pieces is accomplished can be suitably controlled to produce the desired hardness characteristics at the different surface portions. Thus, in the cartridge cases illustrated, cooling water can be supplied at a faster rate to the closed end than to the cylindrical side wall adjacent thereto, whereby the different parts will be cooled at substantially the same rate from the critical hardening temperature.

It will now be understood that an improvement has been provided for heat treating or hardening metallic bodies in rapid succession through a refractory lined tunnel having gas-fired sources of radiant heat at the side walls thereof, and that radiant heat waves are projected from such heat sources, which are maintained in a highly radiant condition, through the atmosphere of the heated products of combustion enveloping the work pieces. By regulating the supply of gas mixture for the radiant heat sources, a predetermined pattern of radiant heat waves may be produced in the path of movement of the work pieces which are intersected by the latter, whereby the desired heating of different surface portions of each work piece can be accomplished in a single pass through the chamber. This is of particular importance in production line machinery for rapidly heat treating work pieces of varying thickness and where graduated hardness and heat treating effects are desired.

This application is a division of my copending application Serial No. 482,697, filed April 12, 1943, entitled "Heat Treatment," which application is now abandoned.

While a single embodiment of the invention has been shown and described, it will be apparent that modifications and changes may be made without departing from the spirit and scope of the invention, as pointed out in the following claims.

What is claimed is:

1. Apparatus for heat treating metallic work pieces in rapid succession comprising a refractory lined tunnel including a top wall and spaced apart side walls extending downwardly therefrom to form an elongated chamber which is of inverted U-shape in section and open at the bottom, a conveyor extending lengthwise of said chamber beneath said top wall comprising a plurality of spaced apart members each constructed and arranged to support a work piece which is adapted to extend upwardly into said chamber, said members being rotatable, means for carrying said members lengthwise of said chamber to cause work pieces supported thereby to travel through the chamber, means for rotating said members to cause rotation of the work pieces while in the chamber, a plurality of vertically displaced sources of radiant heat at the walls of said chamber from which radiant heat waves are adapted to be projected directly into the path of movement of the work pieces and intersected by the later during their travel through said chamber, means for supplying gaseous fuel to said heat sources to heat the latter to a highly radiant condition, and means for regulating said fuel supply means to produce a predetermined pattern of radiant heat waves through which the work pieces are adapted to travel and effect the desired heat treatment at different vertical levels of the surface portions in a single pass of the work pieces through said chamber, whereby a number of similar work pieces may be progressively heat treated in rapid succession in a like manner.

2. Apparatus for heat treating metallic work pieces in rapid succession comprising a refractory lined tunnel including a top wall and spaced apart side walls extending downwardly therefrom to form an elongated chamber which is of inverted U-shape in section and open at the bottom, a conveyor extending lengthwise of said chamber beneath said top wall comprising a plurality of spaced apart members each constructed and arranged to support a work piece which is adapted to extend upwardly into said chamber, said members being rotatable, means for carrying said members lengthwise of said chamber to cause work pieces supported thereby to travel through the chamber, means for rotating said members to cause rotation of the work pieces while in the chamber, a plurality of gas-fired sources of radiant heat vertically spaced along said walls and from which radiant heat waves are adapted to be projected across the path of movement of the work pieces and intersected by the latter during their travel through said chamber at close range to said sources of radiant heat, the products of combustion developed by the gas-firing of said sources of heat augmenting the heating of the work pieces which is accomplished predominantly by the radiant heat waves, and means for regulating the gas-firing of said sources of heat to control the radiant heat energy projected therefrom and effect the desired heat treatment of each work piece at vertically displaced surface portions thereof in a single pass through said chamber, whereby a number of similar work pieces may be progressively heat treated in rapid succession in a like manner.

3. Apparatus for heat treating metallic work pieces in rapid succession comprising a refractory lined tunnel including a top wall and spaced apart side walls extending downwardly therefrom to form an elongated chamber which is of inverted U-shape in section and open at the bottom, a conveyor extending lengthwise of said chamber beneath said top wall, said conveyor comprising a plurality of spaced apart members each constructed and arranged to support a work piece which is adapted to extend upwardly into said chamber, said members being rotatable, means for carrying said members lengthwise of said chamber to cause work pieces supported thereby to travel through the chamber, means for rotating said members to cause rotation of work pieces while in the chamber, a plurality of sources of radiant heat located at vertically displaced positions in said walls from which radiant heat waves are adapted to be projected across the path of movement of the work pieces and intersected by the latter during their travel through said chamber at close range to said sources of radiant heat, means to supply a gaseous heat producing medium to vicinities adjacent to said sources of heat to heat the latter to incandescence, said medium augmenting the heating of the work pieces to an elevated temperature which is accomplished predominantly by the radiant heat waves, and means for individually regulating the supply of said medium to said sources of heat to control the radiant heat energy projected therefrom and effect the desired heat treating of each work piece at different vertical levels of the surface portions thereof in a single pass through said chamber, whereby a number of similar work pieces may be progressively heated to the elevated temperature in rapid succession in a like manner.

4. Apparatus for heat treating metallic workpieces in rapid succession including in combination an elongated furnace of inverted U-shape in section, said furnace having a chamber that is open at the bottom and through which a piece to be heated may be moved in a straight line from one end thereof to the other, a plurality of vertically displaced radiant heat sources located in the walls of said furnace at the sides of said chamber, each heat source adapted to burn a combustible fuel mixture to heat said heat source to incandescence and to supply hot gases of combustion to said chamber, means to adjust individually the supply of combustible mixture to each heat source thereby to obtain a desired heat pattern in said chamber, an elongated conveyor extending below said chamber opening, a plurality of work holding supports mounted in spaced relation on said conveyor so that work to be heated when mounted on said supports will extend through the opening of said chamber into the same, and means to move said conveyor to carry workpieces mounted on said supports through said furnace chamber, the heat pattern produced by said heat sources effecting the desired heat treatment of each workpiece at different levels of the surface portions thereof as they move through said chamber.

5. Apparatus for heat treating work pieces in rapid succession including structure forming an elongated furnace chamber of inverted U-shape and open at the bottom, conveying means having a plurality of spaced work supports thereon, means to move said conveying means intermittently beneath said furnace chamber, each movement thereof carrying said work supports to predetermined stations below said chamber, a plurality of vertically displaced radiant heat sources located in the sides of said chamber at each of said stations, means to supply fuel to each of said sources, and means to adjust individually the supply of fuel to each heat source whereby work pieces on said supports and extending into said chamber may be heat treated in accordance with a desired pattern.

6. The combination of claim 5 including means located adjacent to said conveying means to rotate said work supports when they are located at said stations.

FREDERIC O. HESS.

REFERENCES CITED

The following references are of record in the file of this patent:

UNITED STATES PATENTS

| Number | Name | Date |
| --- | --- | --- |
| 914,188 | Robinson | Mar. 2, 1909 |
| 1,604,292 | Lee | Oct. 26, 1926 |
| 1,872,210 | Wunderlich | Aug. 16, 1932 |
| 1,890,065 | Meehan | Dec. 6, 1932 |
| 2,056,531 | Morton | Oct. 6, 1936 |
| 2,169,776 | Werner | Aug. 15, 1939 |
| 2,182,294 | Kuhnle | Dec. 5, 1939 |
| 2,289,354 | Gardner | July 14, 1942 |
| 2,352,709 | Haase | July 4, 1944 |
| 2,393,521 | Duncan et al. | Jan. 22, 1946 |